United States Patent
Heilemann et al.

(10) Patent No.: US 9,533,548 B2
(45) Date of Patent: Jan. 3, 2017

(54) AIR-DIVERTING ELEMENT WITH A FLOW-OPTIMIZED CONTOUR FOR AN AIR-CONDITIONING SYSTEM

(75) Inventors: Jürgen Heilemann, Wendlingen (DE); Harald Mühleisen, Leinfelden-Echterdingen (DE); Vincenzo Venezia, Weil im Schönbuch (DE); Holger Laux, Balingen (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 434 days.

(21) Appl. No.: 14/003,333

(22) PCT Filed: Mar. 7, 2012

(86) PCT No.: PCT/EP2012/053927
§ 371 (c)(1),
(2), (4) Date: Nov. 12, 2013

(87) PCT Pub. No.: WO2012/120047
PCT Pub. Date: Sep. 13, 2012

(65) Prior Publication Data
US 2014/0054388 A1 Feb. 27, 2014

(30) Foreign Application Priority Data
Mar. 7, 2011 (DE) .......... 10 2011 005 181

(51) Int. Cl.
*B60H 1/00* (2006.01)
*B60H 1/22* (2006.01)

(52) U.S. Cl.
CPC ...... *B60H 1/00457* (2013.01); *B60H 1/00028* (2013.01); *B60H 1/00507* (2013.01);
(Continued)

(58) Field of Classification Search
CPC .............. B60H 1/00457; B60H 1/0028; B60H 1/00507; B60H 2001/00092
See application file for complete search history.

(56) References Cited

U.S. PATENT DOCUMENTS 6,598,670 B1 * 7/2003 Hashimoto ........ B60H 1/00028
165/202
6,913,529 B2 * 7/2005 Seki .................... B60H 1/00042
165/43
(Continued)

FOREIGN PATENT DOCUMENTS

DE 93 14 178 U1 11/1993
DE 102 08 141 A1 9/2003
(Continued)

OTHER PUBLICATIONS

International Search Report, PCT/EP2012/053927, Nov. 6, 2012, 3 pgs.
(Continued)

*Primary Examiner* — Steven B McAllister
*Assistant Examiner* — Jonathan Cotov
(74) *Attorney, Agent, or Firm* — Paul D. Strain, Esq.; Strain & Strain PLLC

(57) ABSTRACT

The invention relates to an air-diverting element with a flow-optimized contour for an air-conditioning system, in particular of a motor vehicle, which air-diverting element extends approximately perpendicular to an air flow direction. To divert an air flow through approximately 180° and at the same time nevertheless prevent pressure losses and disadvantageous acoustic effects, one end of the air-diverting element is adjoined by an approximately parabolic elongation which is situated opposite that side of the air-diverting element which faces away from the air flow direction.

9 Claims, 4 Drawing Sheets

Figure 1:
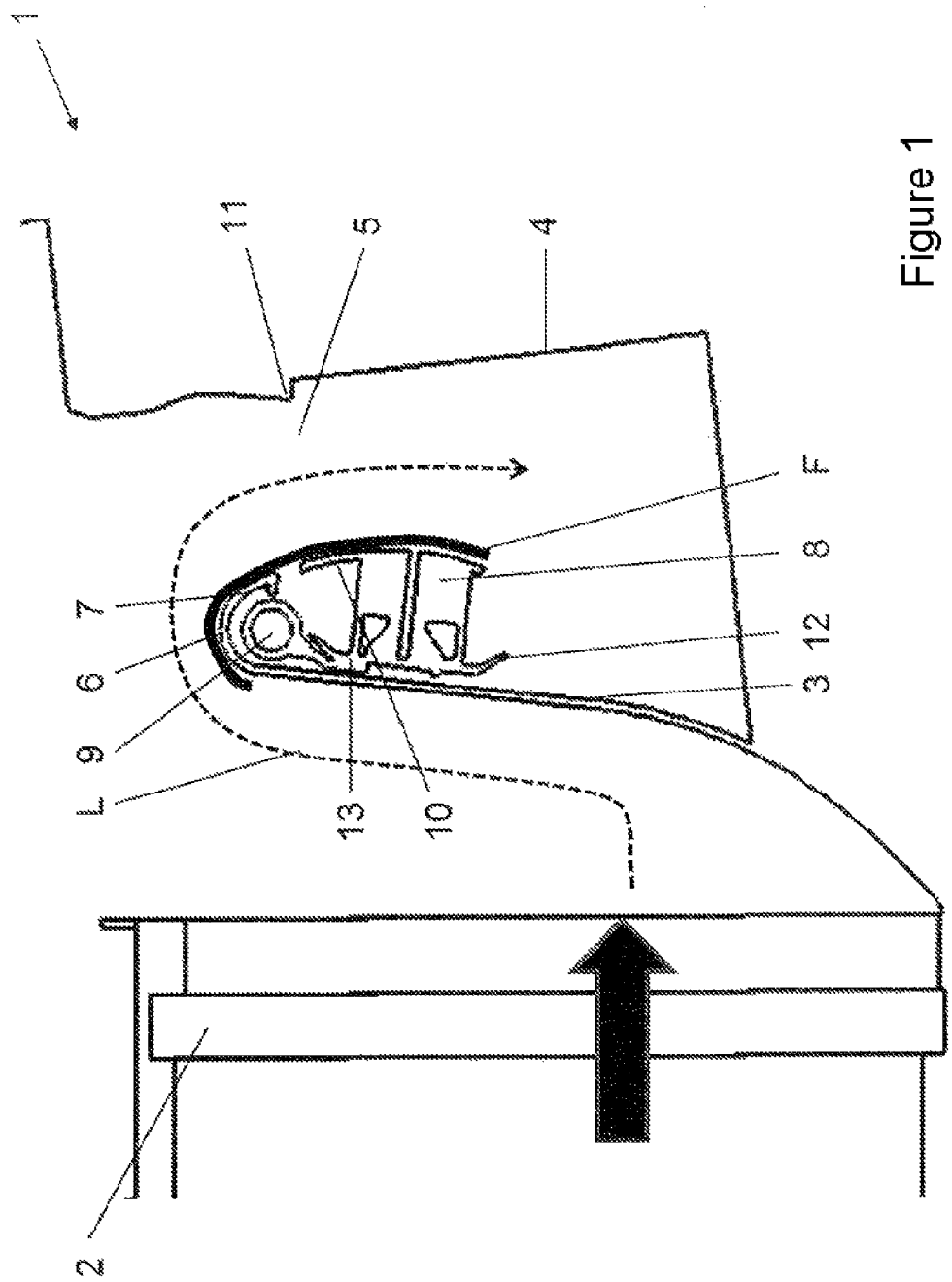

(52) U.S. Cl.
CPC ....... *B60H 1/00671* (2013.01); *B60H 1/2225* (2013.01); *B60H 2001/00092* (2013.01); *B60H 2001/00721* (2013.01)

(56) References Cited

U.S. PATENT DOCUMENTS

| | | | | |
|---|---|---|---|---|
| 7,625,273 B2* | 12/2009 | Komowski | ........ | B60H 1/00678 137/875 |
| 7,857,041 B2* | 12/2010 | Fukagawa | .......... | B60H 1/00685 165/202 |
| 7,950,444 B2* | 5/2011 | Masatsugu | ......... | B60H 1/00842 165/202 |
| 7,985,124 B2* | 7/2011 | Komowski | ........ | B60H 1/00685 454/121 |
| 8,511,371 B2* | 8/2013 | Onda | ................. | B60H 1/00685 165/202 |
| 2001/0012756 A1* | 8/2001 | Komowski | ........ | B60H 1/00685 454/8 |
| 2003/0213579 A1 | 11/2003 | Nakagawa et al. | | |
| 2004/0029520 A1 | 2/2004 | Biasiotto et al. | | |
| 2004/0093884 A1* | 5/2004 | Seki | ................... | B60H 1/00842 62/244 |
| 2004/0144521 A1* | 7/2004 | Farag | ................. | B60H 1/00028 165/42 |
| 2005/0247445 A1* | 11/2005 | Biasiotto | ............ | B60H 1/00071 165/202 |
| 2006/0027354 A1* | 2/2006 | Vincent | .............. | B60H 1/00028 165/42 |
| 2006/0060342 A1* | 3/2006 | Yamamoto | ......... | B60H 1/00028 165/202 |
| 2007/0181295 A1* | 8/2007 | Masatsugu | ......... | B60H 1/00842 165/202 |
| 2007/0204985 A1* | 9/2007 | Fukagawa | .......... | B60H 1/00685 165/203 |
| 2008/0256965 A1* | 10/2008 | Bopp | ................. | B60H 1/00664 62/239 |
| 2008/0295992 A1* | 12/2008 | Shindoh | ............. | B60H 1/00028 165/42 |
| 2009/0209189 A1* | 8/2009 | Kiel | ................... | B60H 1/00685 454/145 |
| 2009/0242167 A1* | 10/2009 | Onda | ................. | B60H 1/00685 165/61 |

FOREIGN PATENT DOCUMENTS

DE  10 2005 041 725 A1  3/2007
DE  60 2004 002 821 T2  8/2007
EP     1 514 708 A1     3/2005

OTHER PUBLICATIONS

German Search Report, DE 10 2011 005 181.3, Aug. 31, 2011, 8 pgs.

* cited by examiner

AIR-DIVERTING ELEMENT WITH A FLOW-OPTIMIZED CONTOUR FOR AN AIR-CONDITIONING SYSTEM

CROSS-REFERENCE TO RELATED PATENT APPLICATIONS

This application is a National Stage of International Application No. PCT/EP2012/053927, filed Mar. 7, 2012, which is based upon and claims the benefit of priority from prior German Patent Application No. 10 2011 005 181.3, filed Mar. 7, 2011, the entire contents of all of which are incorporated herein by reference in their entirety.

The invention relates to an air-diverting element with a flow-optimized contour for an air-conditioning system, more particularly of a motor vehicle, which extends approximately perpendicular to an air flow direction.

In air-conditioning systems an air flow often has to be guided round an obstruction. These obstructions are thereby formed by special housing contours or by ventilation flaps which divert the air flow into a specific direction. Such diversion sites formed by the housing contour or the air-guide flaps thereby have a relatively simple form in that they are designed with a sharp edge at their diversion sites. As a result of this sharp-edge configuration of the diversion sites, separations in the flow and turbulences can arise at these sites. These turbulences lead to an increased speed, the result of which is a drop in pressure in the air flow. At the same time acoustic nuisance occurs as a result of these flow separations.

A particularly high pressure loss is to be experienced when the air flow is guided round an air-diverting element which is to divert the air flow round 180°. The high pressure loss leads to a reduction in the amount of air and is also in addition negatively reflected in noise production.

The object of the invention is therefore to provide an air-diverting element with a flow-optimized contour in which, with a diversion of the air flow round approximately 180°, high pressure losses are prevented.

According to the invention this is achieved in that one end of the air-diverting element is adjoined by an approximately parabolic elongation which is situated opposite that side of the air-diverting element which faces away from the air flow direction. This has the advantage that through the optimized form of the air-diverting element gaps and turbulences in the air flow are minimized whereby the flow rate and thus the pressure loss as well as acoustic interferences are reduced. The air flow can thus be diverted by 180° without great interference.

More advantageously a ratio of a broadest distance of the approximately parabolic elongation from the air-diverting element to the distance of an apex point of the approximately parabolic elongation from the broadest distance is greater than 0.1. Such dimensioning of the air-diverting element makes it possible to divert the air by approximately 180° wherein dead water and flow gaps are minimized. By dead water is thereby meant the region of the air-diverting element in which there is practically no air flow after the diversion.

In one development the approximately parabolic elongation is an integrated constituent part of the air-diverting element. The air-diverting element comprises at one end a rounded area which causes an undisturbed direction change of the air flow. Since such an air-diverting element is normally made from plastics, the flow-optimized contour of the air-diverting element can be made with the approximately parabolic elongation simply in only one method step in a manufacturing process.

In a variation the approximately parabolic elongation is made in two parts wherein a first part of the elongation which includes the apex point, is a constituent part of the air-diverting element, whilst a second part of the elongation which adjoins the first part is formed by a separate air guide element. The air-diverting element can thus be optimized accordingly based on the requirements laid down for the present use and can be combined with a second air-guide element which can furthermore undertake additional tasks within the air-conditioning system.

In a further development the air-guide element is disposed in an interspace formed by the air-diverting element and the approximately parabolic elongation wherein an external contour of the air-guide element forms the second part of the approximately parabolic elongation. A particularly space-saving arrangement is thereby possible for the air-guide element in the air-conditioning system since the air-guide element is mounted on the lee side of the air-diverting element, which is conventionally termed dead water. Since this region has no air flow after the diversion this region is of particular advantage for the positioning of the air-guide element.

In another embodiment the air-guide element is designed as a ventilation flap which in the opened state releases a channel between the air-diverting element and a housing wall of the air-conditioning system for diverting an air flow round approximately 180°. Arranging a ventilation flap on the side of the air-diverting element which faces away from the air flow provides a particularly optimum variation in which the air-conditioning system can be made with particularly small dimensions. The ventilation flap thereby undertakes in addition to opening and closing a channel inside the air-conditioning system at the same time also the function of optimized guide for the air flow in order to prevent separations in the flow and thus a pressure drop and loss of air flow.

For optimum utilization of the interspace of the air-diverting element which is not touched by the air flow, a rotational axis of the ventilation flap is arranged close to the apex point of the first part of the approximately parabolic elongation and axially relative to the latter.

More advantageously the outer contour of the ventilation flap which forms the second part of the approximately parabolic elongation is formed by a spoiler. Thus a separate element of the approximately parabolic elongation can be omitted since the spoiler of the ventilation flap undertakes at the same time the task of the approximately parabolic elongation.

In a further variation the ventilation flap has a seal at an end of a vane supporting the spoiler and opposite the spoiler. The channel which is to be closed by the ventilation flap can thereby be reliably sealed from the resulting air flow.

In a further development, the air-diverting element is arranged with the side facing away from the approximately parabolic elongation in front of a heating element of the air-conditioning system. Through the approximately perpendicular position of the air-diverting element relative to the air flow which flows out from the heating element it is ensured that the hot air flow which leaves the heating element is mixed with a cold air flow which flows along above the heating element, and this mixed air flow is diverted by the air-diverting element round approximately 180° in the direction of the channel of the air-conditioning system.

The invention permits numerous embodiments. One of these will be explained in further detail below with reference to the figures illustrated in the drawings.

Figure 2:
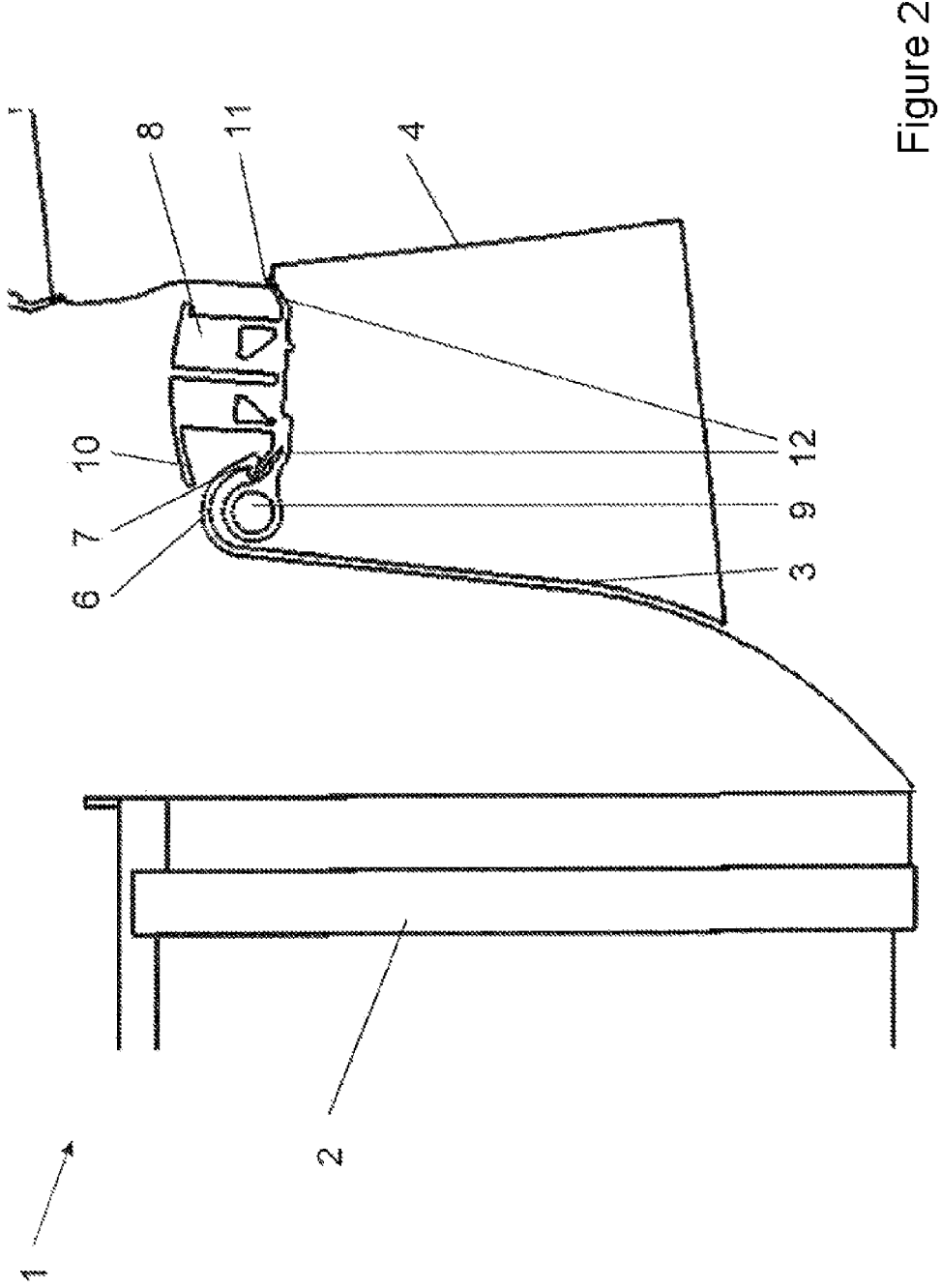
Figure 3:
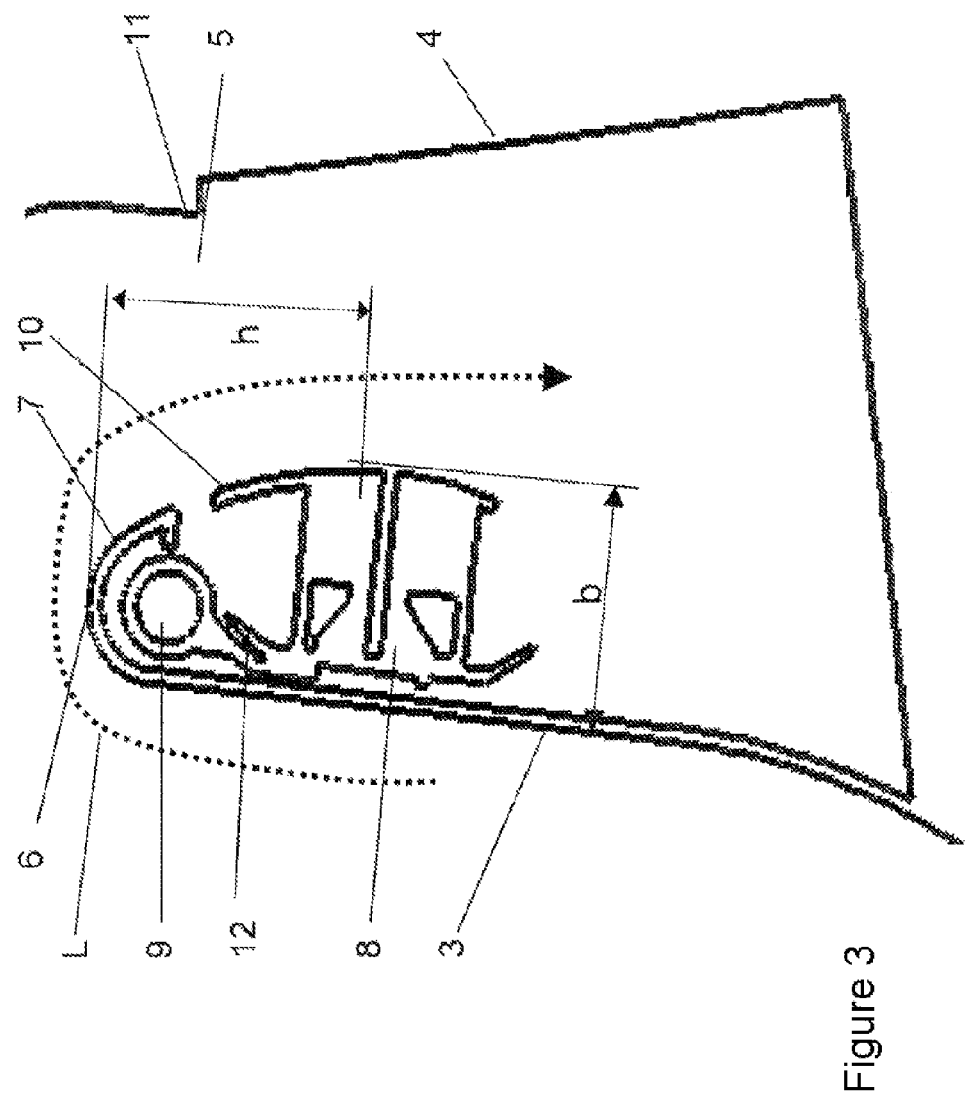
Figure 4:
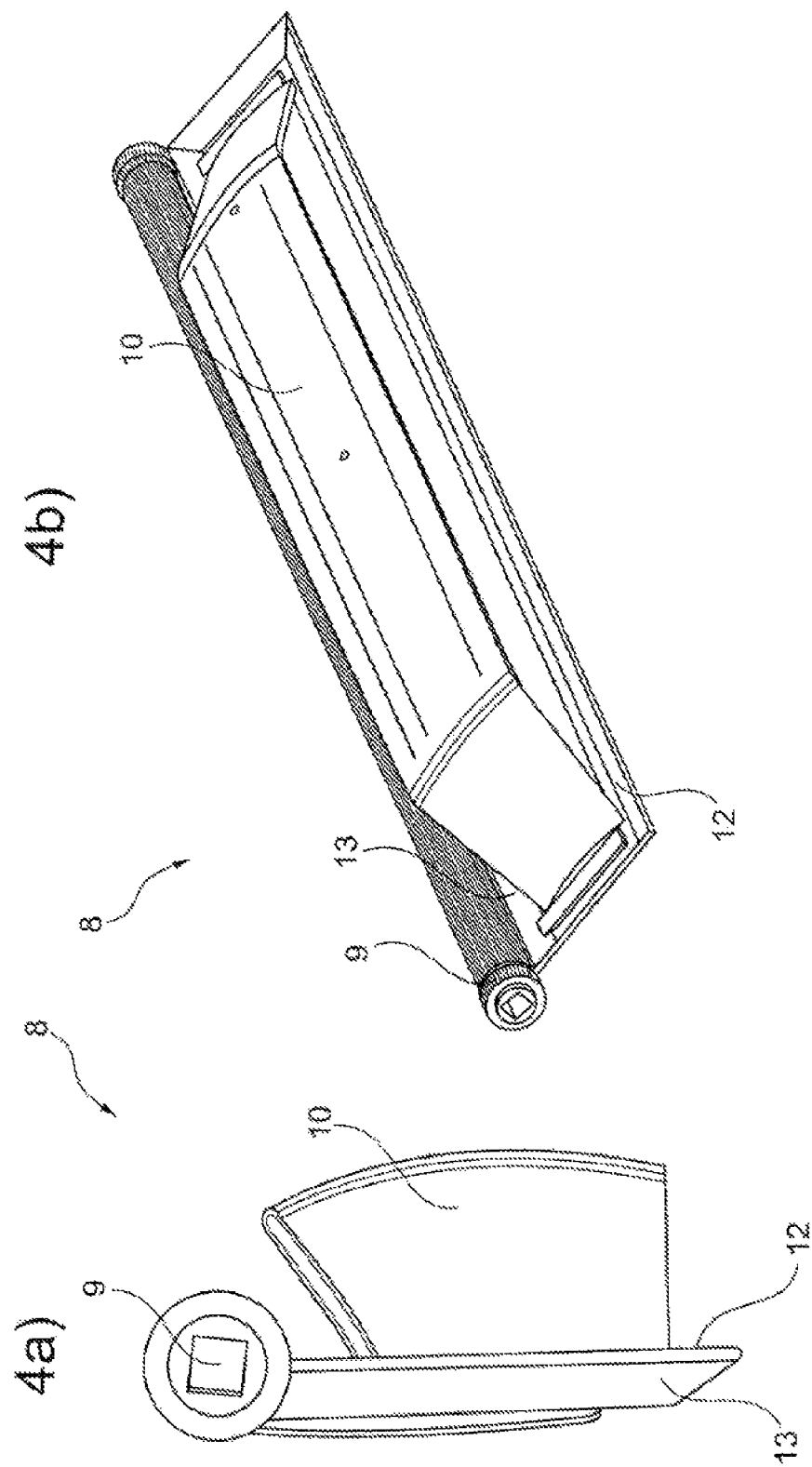

These show:

FIG. 1 an embodiment of the contour-optimized air-diverting element according to the invention in an air-conditioning system with a ventilation flap in the opened position;

FIG. 2 an embodiment according to FIG. 1 with the ventilation flap in the closed position;

FIG. 3 dimensions of the ventilation element according to the invention;

FIG. 4 an embodiment for a ventilation flap with a spoiler.

The same features are marked with the same reference numerals.

FIG. 1 illustrates an embodiment for an air-diverting element 3 according to the invention which is arranged in an air-conditioning system 1, more particularly for a motor vehicle. The air-conditioning system 1 thereby comprises a heating element 2 wherein the air-diverting element 3 is mounted opposite the air outlet from the heating element 2. The air-diverting element 3 is designed as a straight wall which extends approximately perpendicular to the air flow which flows out from the heating element 2. The air-guide element 3 forms a channel 5 with a housing 4 which lies opposite the air-guide element 3.

The air-guide element 3 thereby has an approximately parabolic elongation which for better illustration is shown by a virtual curve F which does not belong to the air-guide element 3. In concrete form the air-guide element 3 is designed in two parts. Whilst the air-guide element 3 is made substantially flat on the side facing the heating element 2 it is adjoined at one end by a rounded area which forms the apex point 6 of the approximately parabolic elongation of the air-guide element 3. The apex point 6 forms with a first part of the parabolic-shaped elongation 7 which adjoins the apex point 8 an integral constituent part of the air-diverting element 3.

Close to the apex point 6 of the air-guide element 3 there is a rotational axis 9 of a ventilation flap 8 wherein the rotational axis 9 of the ventilation flap 8 extends axially to the apex point 6. The ventilation flap 8 is thereby shown in the position in which the channel 5 is opened. As a result of the arrangement of the opened ventilation flap 8 on the side of the air-diverting element 3 which faces away from the air flow L, the ventilation flap 8 is mounted in a region which is not touched by the diverted air flow L, and is therefore designed as "dead water". In the opened position the ventilation flap 8 adjoins approximately the flat side of the air-diverting element 3 which faces away from the heating element 2 wherein the ventilation flap 8 has a vane 13 on which a spoiler 10 is mounted. This spoiler 10 represents an elongation of the first part 7 of the approximately parabolic elongation and is thus to be regarded as a second part of the approximately parabolic elongation.

The spoiler 10 thereby forms in the shape of its outer contour a projection of the first part 7 of the parabolic-shaped elongation.

As a result of this arrangement the heated air flow L flowing out from the heating element 2 rises up at the flat wall of the air-diverting element 3. A cold air flow (not shown in further detail) flows above the heating element 2 through the air-conditioning system 1 and mixes with the hot air flow L which flows out of the heating element 2. As a result of the approximately parabolic shaping of the air-guide element 3 the mixed air flow L is diverted by approximately 180° and is passed through the channel 5 into further parts of the air-conditioning system 1. Through the approximately parabolic configuration of the air-diverting element 3 and in combination with the spoiler 10 of the ventilation flap 8 the function of diverting the air flow L is coupled with the flap function.

FIG. 2 shows the ventilation flap 8 in the air-conditioning system 1 in a closing function wherein the channel 5 is closed by the ventilation flap 8. The ventilation flap 8 thereby projects with the spoiler 10 in the direction of the air flow L which flows out of the heating element 2 and is mixed with that flowing along above the heating element 2. A seal 12 which is formed at the end of the flap 8 opposite the spoiler 10 and which completely surrounds the ventilation flap 8 leads to a complete seal against the air flow L. The seal 12 thereby one time adjoins the end of the first part of the parabolic-shaped elongation 7 whilst a flap stop 11 is formed on the housing wall 4 opposite which the seal 12 is positioned to contact same. Through the approximately parabolic configuration of the air flap element 3 gaps in the flow of the air flow L and thus the creation of vortices during diversion of the air flow L about approximately 180° are minimized, so that the flow rates are reduced whereby the pressure loss and acoustic disadvantages are also consequently prevented.

FIG. 3 clearly shows the dimensions of the air-diverting element 3 according to the invention. The width b represents the broadest distance of the parabolic-shaped elongation in the vertical direction of the ventilation flap 8 in relation to the straight alignment of the air-diverting element 3. The height h determines the distance between the apex point 6 of the air-diverting element 3 and the broadest distance b. For optimum air flow L it is advantageous if the air-diverting element 3 is dimensioned so that the ratio is $$b/h > 0.1.$$

The broadest distance b is dependent on the flow rate of the diverted air flow. The greater the flow rate then the greater b has to be.

FIG. 4a shows a side view of the ventilation flap 8. The spoiler 10 is thereby arranged on the vane 13 of the ventilation flap 8, and extends away from the vane 13. The vane 13 is connected to the rotational axis 9 which according to FIG. 1 is positioned close to the apex point 6 of the air-diverting element 3. The curvature of the spoiler 10 facing away from the vane 13 thereby has the projection of the curvature of the first part 7 of the parabolic-shaped elongation of the air-diverting element 3 and thus enables the desired aerodynamic effect.

FIG. 4b shows a perspective view of the extension of the spoiler 10 on the vane 13 along the rotational axis 9.

As a result of the special aerodynamic configuration of the air-diverting element 3 in combination with the spoiler 10 of the ventilation flap 8 an air-diverting element is provided which has a favorable flow contour. Separations and turbulences of the air flow L, as occur according to the prior art in angular and angled air-diverting elements, are reliably prevented since the pressure drop is reduced and acoustic disadvantages are eliminated.

The invention claimed is:

1. An air-diverting element with a flow-optimized contour for an air-conditioning system of a motor vehicle,
   wherein the air-diverting element comprises a first portion and a second portion, wherein the first portion is substantially flat on a side facing a source of an air flow, wherein the second portion comprises a first curved region and adjoins the first portion at one end of the first portion, wherein a ventilation flap is arranged on the side of the air diverting element opposite the source of the air flow, wherein the ventilation flap comprises an outer contour, wherein the outer contour comprises a second curved region, wherein the first curved region and the second curved region form an approximately parabolic elongation of the air-diverting element, wherein the second portion comprises an apex point, wherein a rotational axis of the ventilation flap is arranged close to the apex point of the second portion of the air-diverting element and axially relative to the air-diverting element, wherein the ventilation flap further comprises a vane, a first seal, and a second seal, wherein the vane is connected to the rotational axis of the ventilation flap, wherein the first seal and the second seal are arranged on the vane, wherein the outer contour of the ventilation flap is supported on the vane at a distance from the vane.

2. The air-diverting element as claimed in claim 1, wherein a ratio of
  (a) a greatest perpendicular distance between the air-diverting element and the outer contour of the ventilation flap
to
  (b) the distance between an apex of the second portion of the air-diverting element and
  the point on the outer contour of the ventilation flap used to calculate distance (a) is greater than 0.1 when the ventilation flap is a wide open position.

3. The air-diverting element as claimed in claim 1, wherein the second portion of the air-diverting element is an integrated constituent part of the air-diverting element.

4. The air-diverting element as claimed in claim 1, wherein the ventilation flap is arranged in an interspace formed by the air-diverting element and the approximately parabolic elongation.

5. The air-diverting element as claimed in claim 1, wherein the ventilation flap is formed as an air flap which in the opened position releases a channel between the air-diverting element and a housing wall of the air-conditioning system for diverting an air flow by approximately 180°.

6. The air-diverting element as claimed in claim 5, wherein the outer contour of the ventilation flap forming the second part of the approximately parabolic elongation is formed by a spoiler.

7. The air-diverting element as claimed in claim 6, wherein the ventilation flap has a seal at one end of a vane supporting the spoiler and opposite the spoiler.

8. The air-diverting element as claimed in claim 5, wherein the ventilation flap is formed as an air flap which in the closed position blocks a channel between the air-diverting element and a housing wall of the air-conditioning system, wherein in the closed position the first seal seals the ventilation flap against the second portion of the air-diverting element and the second seal seals the ventilation flap against a channel wall, wherein in the closed position the outer contour of the ventilation flap projects above the apex point of the second portion of the air-diverting element.

9. The air-diverting element as claimed in claim 1, wherein the air-diverting element is arranged with a side facing away from the approximately parabolic elongation, in front of a heating element of the air-conditioning system.

* * * * *